United States Patent [19]
Mills et al.

[11] Patent Number: 6,055,878
[45] Date of Patent: May 2, 2000

[54] ADJUSTABLE ECCENTRIC SHIFT MECHANISMS

[75] Inventors: Ned D. Mills, West Richland; Benjamin K. Jones, Seattle, both of Wash.

[73] Assignee: Speed Control, Inc., Spokane, Wash.

[21] Appl. No.: 08/991,815

[22] Filed: Dec. 16, 1997

[51] Int. Cl.$^7$ ................................. F16H 29/04
[52] U.S. Cl. ............................ 74/117; 475/162
[58] Field of Search ...................... 74/114–117; 475/162, 475/168, 170; 192/85 AA

[56] References Cited

U.S. PATENT DOCUMENTS

| | | | |
|---|---|---|---|
| 1,872,636 | 8/1932 | Greening et al. . | |
| 2,521,711 | 9/1950 | Galliano | 74/117 |
| 2,573,472 | 10/1951 | Martin | 475/97 |
| 4,164,153 | 8/1979 | Moritsch et al. | 74/217 |
| 4,194,407 | 3/1980 | Gogins | 74/117 |
| 4,299,581 | 11/1981 | Korosue | 474/69 |
| 4,352,297 | 10/1982 | Nardi | 74/63 |
| 4,546,990 | 10/1985 | Harriger | 280/216 |
| 4,660,427 | 4/1987 | Fenton | 74/63 |
| 4,684,143 | 8/1987 | Sato | 280/216 |
| 4,697,469 | 10/1987 | Takamiya et al. | 74/117 |
| 4,789,001 | 12/1988 | Backe et al. | 74/49 X |
| 4,811,624 | 3/1989 | Fritsch | 74/571 |
| 5,013,288 | 5/1991 | Parsons | 475/166 |
| 5,081,877 | 1/1992 | Mercat | 74/116 |
| 5,387,000 | 2/1995 | Sato | 280/216 |
| 5,454,766 | 10/1995 | Mills | 475/170 |
| 5,495,926 | 3/1996 | Rheingold | 192/60 |
| 5,516,132 | 5/1996 | Simkins | 280/236 |
| 5,632,702 | 5/1997 | Mills | 475/170 |

FOREIGN PATENT DOCUMENTS

| | | |
|---|---|---|
| 0 208 473 | 1/1987 | European Pat. Off. . |
| 393180 | 4/1924 | Germany . |
| WO 95/06829 | 3/1995 | WIPO . |
| WO 97/02175 | 1/1997 | WIPO . |

OTHER PUBLICATIONS

Pump replaces chain in bicycle drive—Pedal power circulates fluid to rotate wheel, Design News, Jun. 23, 1997.

*Primary Examiner*—Khoi Q. Ta
*Attorney, Agent, or Firm*—Wells, St. John, Roberts, Gregory & Matkin P.S.

[57] ABSTRACT

The present invention provides shift mechanisms and methods of controlling a transmission. According to one embodiment of the present invention, a shift mechanism for use with a transmission includes a central axle defining a central axis; a master cylinder configured to increase the pressure of a liquid; and an eccentric assembly comprising a support member provided about the central axle and an eccentric mount coupled with the support member, the eccentric mount defining an eccentric axis and being in fluid communication with the master cylinder and configured to provide radial adjustment of the eccentric axis relative to the central axis providing adjustment of the gear ratio of the transmission.

26 Claims, 6 Drawing Sheets

ADJUSTABLE ECCENTRIC SHIFT MECHANISMS

TECHNICAL FIELD

This disclosure relates to shift mechanisms and methods of controlling a transmission.

BACKGROUND OF THE INVENTION

Changeable speed transmissions for bicycles have been proposed and used for many years. These have included various rear wheel hub transmissions, which typically achieved two or three specified speed reductions, as well as derailleur systems, which use the driving chain as a force transmitting element between selectable rear and/or front sprockets.

An improved transmission is described in U.S. Pat. No. 5,632,702 to Mills, assigned to the assignee of the present invention and incorporated herein by reference. This patent discloses a continuously variable transmission. This patent further teaches the use of a sprocket which serves as an adjusting mechanism operably connected to an inner eccentric element and outer eccentric element. Adjusting the position of the inner eccentric element and the outer eccentric element adjusts the gearing of the transmission.

The '702 patent teaches the use of a worm gear to provide increased torque to the extension shaft of the disclosed adjustment mechanism. Such a configuration eases the adjustment and selection of the desired gear ratio provided by the transmission. This is favorable to reduce the impact of working forces exerted on the internal components of the transmission during operation.

The present invention discloses an improved method of providing operator control of the gearing of a transmission. The shift mechanism and methods of controlling the transmission disclosed herebelow provide improved mechanical operation and reduced effort on the part of the operator to change the gearing of the associated transmission even while operating under load.

BRIEF DESCRIPTION OF THE DRAWINGS

A preferred embodiment of the invention is described below with reference to the accompanying drawings, which are briefly described as follows.

FIG. 3A is a cross-sectional view similar to FIG. 3 of the eccentric mount in a second position with respect to the central axle.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 3:
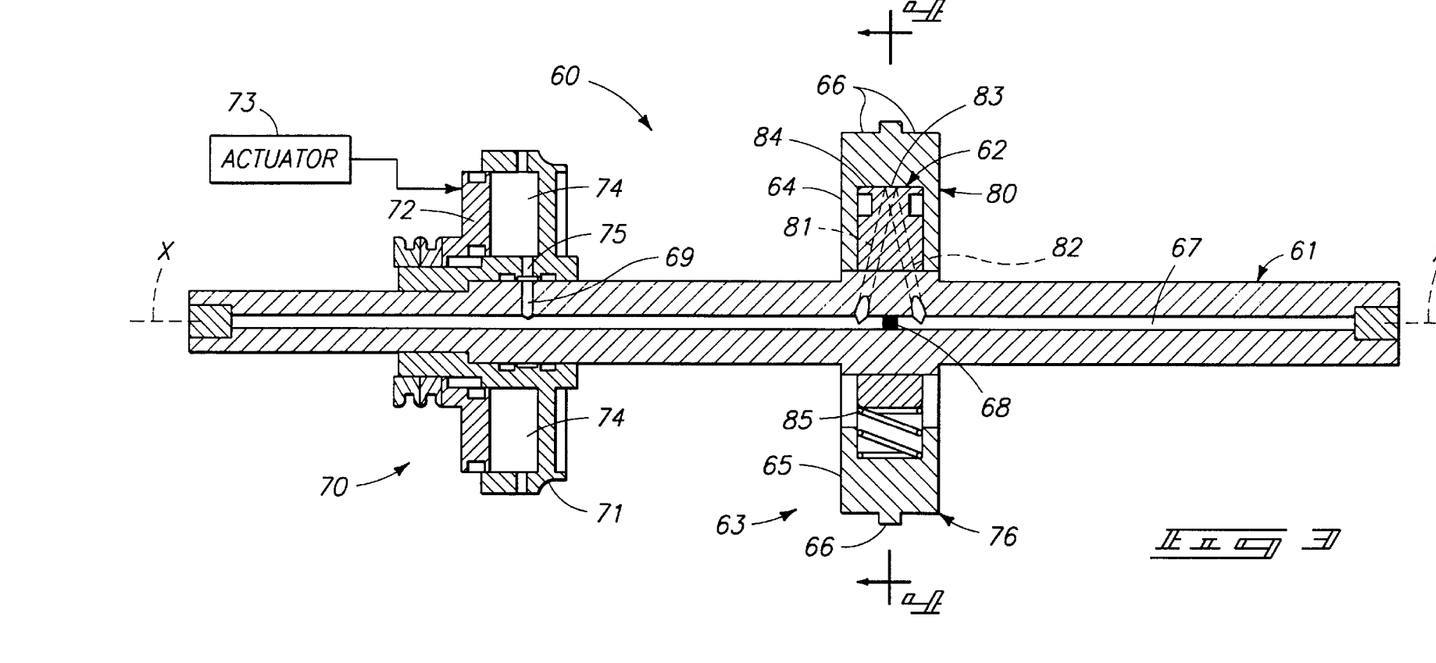
FIG. 3 is a cross-sectional view taken along line 3—3 of the shift mechanism shown in FIG. 1 wherein an eccentric mount of the eccentric assembly is provided in a first position with respect to the central axle.
Figure 3B:
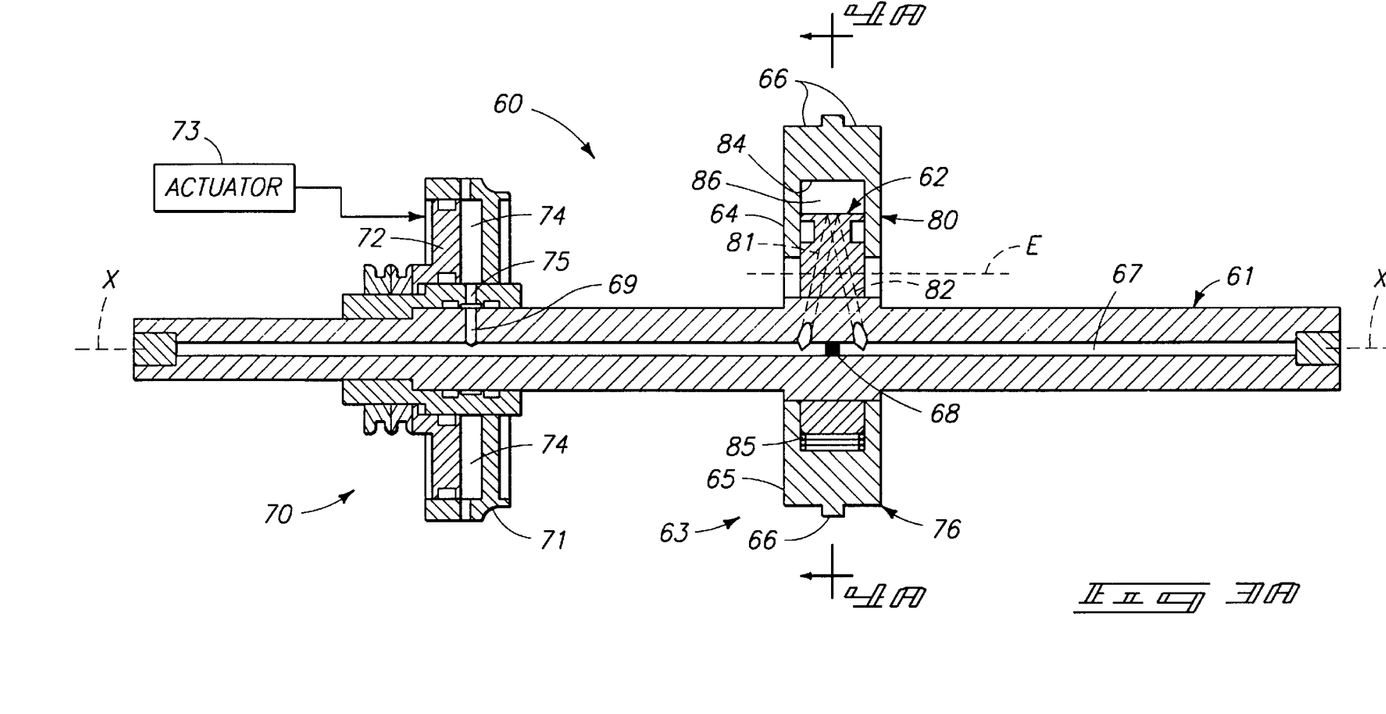
Figure 4:
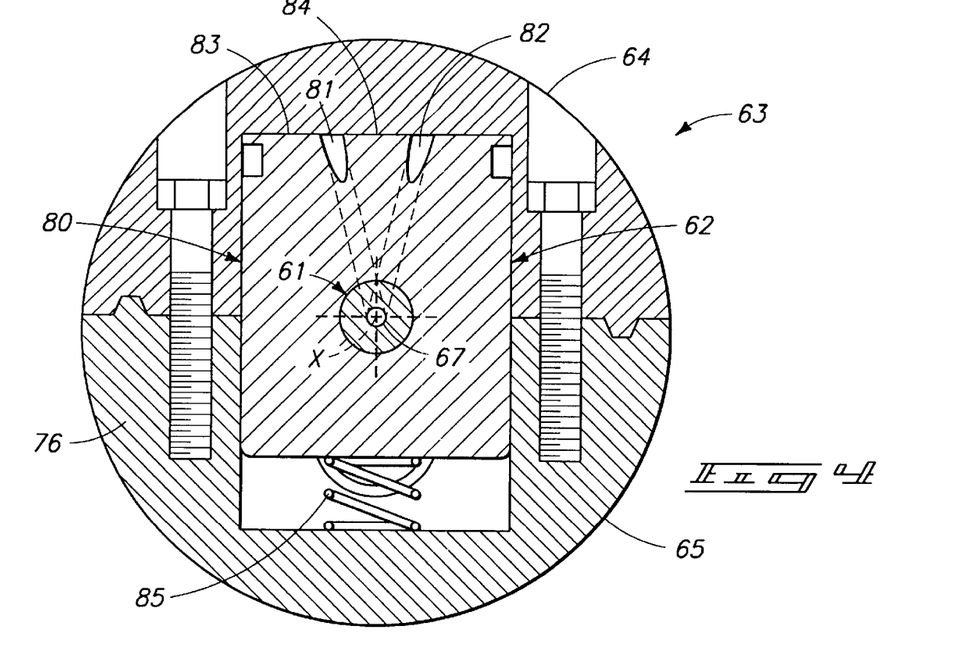
FIG. 4 is a cross-sectional view taken along line 4—4 of the eccentric mount shown in FIG. 3 in the first position.

A first embodiment of a shift mechanism for a transmission is shown in FIG. 1–FIG. 4B. The first embodiment is designed specifically for use within a rear wheel hub of a bicycle. A second embodiment of the shift transmission is depicted in FIG. 5 and FIG. 5A. The second embodiment is configured for application about a crank axle of a bicycle.

The disclosed shift mechanisms are described herein with reference to a continuously variable transmission, such as the transmission disclosed in the '702 patent incorporated by reference above. It is to be understood that the shift mechanism in accordance with the present invention may be utilized in other bicycle applications or transmissions. In addition, shift mechanisms of the present invention can be used or modified for use in applications or vehicles other than bicycles.

According to a first aspect of the present invention, a shift mechanism for use with a transmission comprises: a central axle defining a central axis; a master cylinder configured to increase the pressure of a liquid; and an eccentric assembly comprising a support member provided about the central axle and an eccentric mount coupled with the support member, the eccentric mount defining an eccentric axis and being in fluid communication with the master cylinder and configured to provide radial adjustment of the eccentric axis relative to the central axis providing adjustment of the gear ratio of the transmission.

A second aspect of the present invention provides a transmission comprising first and second rotatable members individually configured for rotation about a central axis defined by a central axle; an orbiter coupled with the first and second rotatable members and configured for rotation about an eccentric axis, and a shift mechanism configured to adjust the position of the eccentric axis relative to the central axis and the shift mechanism comprises: a master cylinder configured to adjust the pressure of a fluid; a support member provided about the central axle; and an eccentric mount defining the eccentric axis and configured to rotatably support the orbiter, the eccentric mount being in fluid communication with the master cylinder and slidably mounted to the support member and movable between first and second positions responsive to the pressure of the fluid.

Another aspect of the present invention provides a method of controlling a transmission comprising: providing a support member about a central axis; providing an eccentric mount defining an eccentric axis; supplying a fluid to the eccentric mount; adjusting the pressure of the fluid; and adjusting the eccentricity of the eccentric axis with respect to the central axis responsive to the adjusting of the pressure of the fluid.

Figure 1:
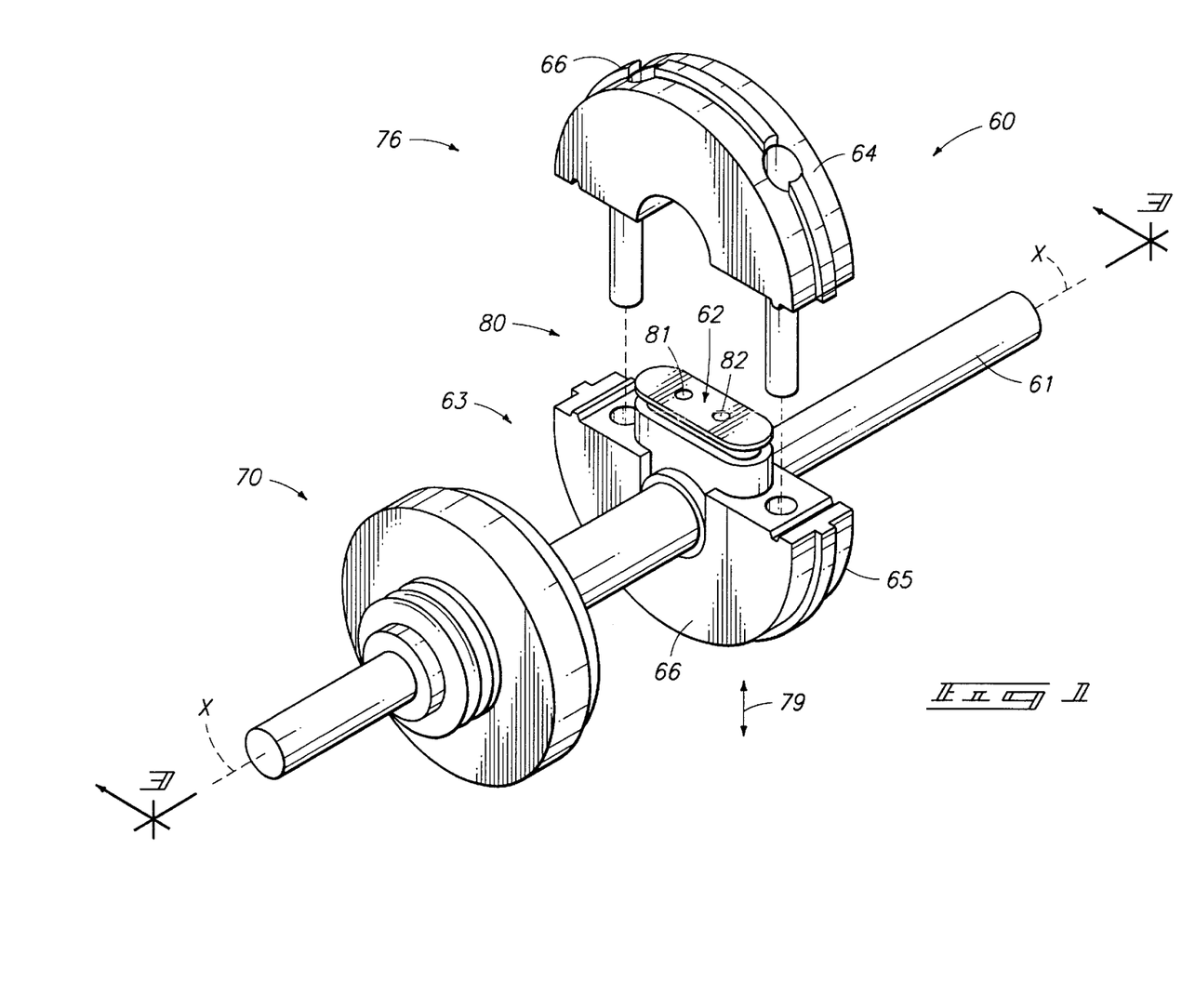
FIG. 1 is an isometric view of a central axle, eccentric assembly and master cylinder in accordance with one embodiment of the shift mechanism of the present invention.

Referring to FIG. 1, one embodiment of a shift mechanism in accordance with the present invention is generally designated as 60. Shift mechanism 60 is configured to adjust the gear ratio of a continuously variable transmission (not shown in FIG. 1) as described below.

The illustrated embodiment of the shift mechanism 60 comprises a central axle 61, an eccentric assembly 63 and a master cylinder assembly 70. Eccentric assembly 63 includes a support member 62 and an eccentric mount 76. First and second eccentric members 64, 65 form eccentric mount 76 in the depicted embodiment.

According to the first embodiment of the present invention, eccentric assembly 63 forms a slave cylinder 80. The central axle 61 provides a system ground in this embodiment of the invention. As is discussed in detail below, hydraulic shifting via the slave cylinder 80 is essentially actuated with respect to this reference frame.

As shown in FIG. 1, a central axis X—X is coaxial with central axle 61. Cross member or support member 62 is mounted to central axle 61 in the depicted embodiment. Support member 62 is fixed relative to the grounded central axle 61. First and second eccentric members 64, 65 are fixedly coupled with one another about support member 62. In particular, eccentric members 64, 65 are connected to form eccentric mount 76 configured for slidable engagement with support member 62 as represented by arrow 79 in FIG. 1. Eccentric mount 76 comprises an eccentric disk in the first embodiment of the invention.

Figure 4A:
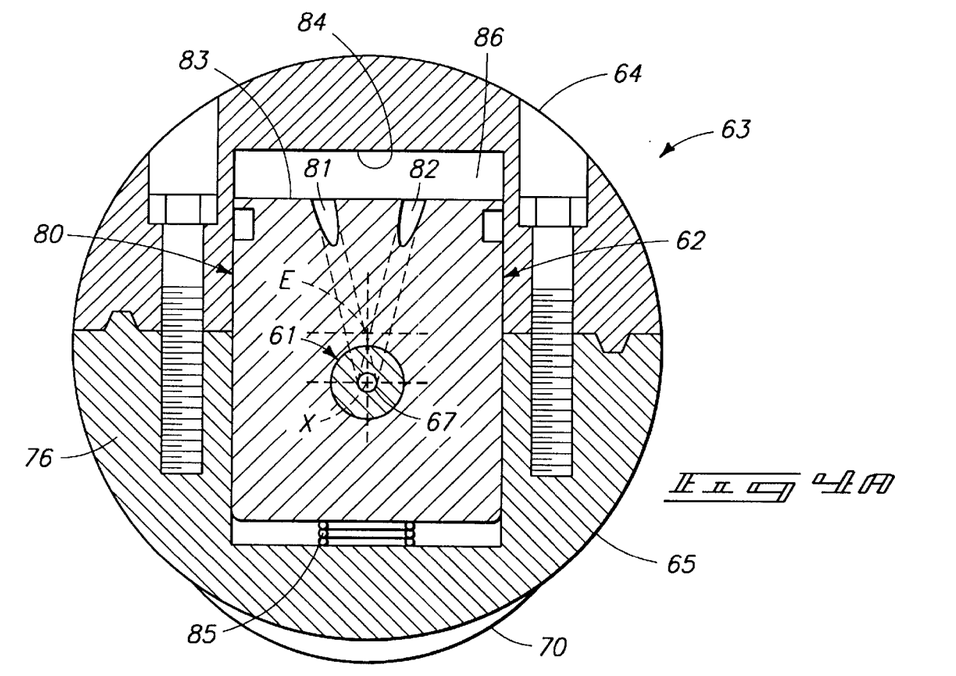
FIG. 4A is a cross-sectional view taken along line 4A—4A of the eccentric mount shown in FIG. 3A in the second position.
Figure 5:
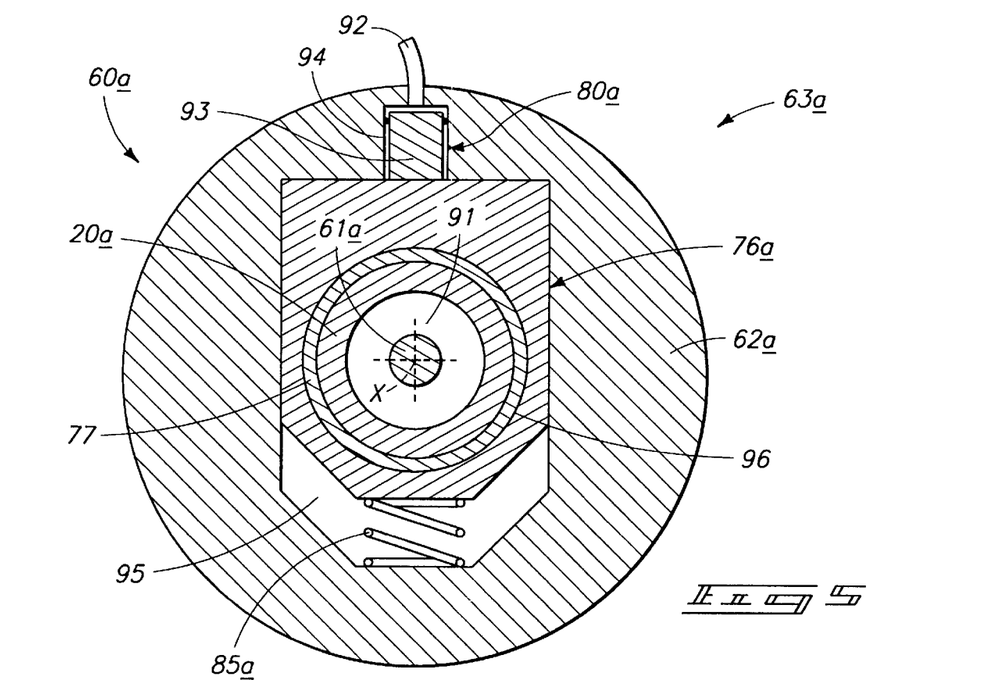
FIG. 5 is a cross-sectional view of a second embodiment of a shift mechanism having an eccentric mount in a first position.
Figure 5A:
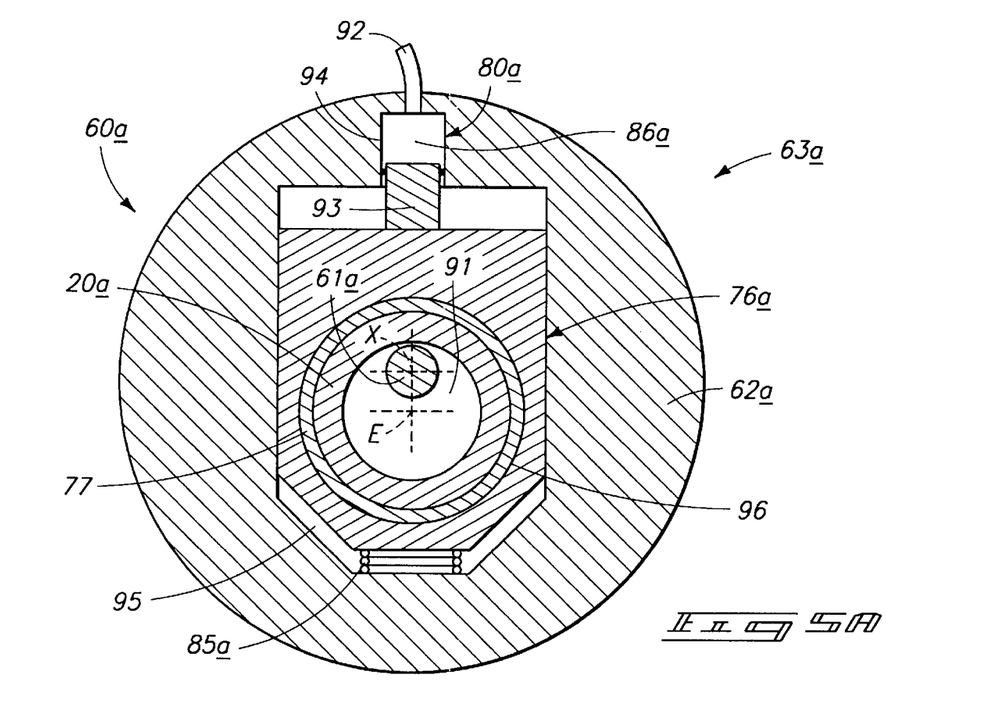
FIG. 5A is a cross-sectional view showing the eccentric mount of the shift mechanism of FIG. 5 in a second position.

The eccentric disk or mount 76 defines an eccentric axis E—E (shown in FIG. 3A and FIG. 4A). Eccentric axis E—E is substantially parallel and radially adjustable with respect to central axis X—X as also represented by arrow 79. As described in detail below, the eccentric mount 76 slides between predefined first and second positions as described below during adjustment of the gearing ratio of the associated transmission 12. In the illustrated embodiment, eccentric axis E—E is coaxial with central axis X—X when eccentric mount 76 is provided in a first position. Radial adjustment of the position of the eccentric mount 76 (and eccentric axis E—E) with respect to the central axis X—X adjusts the gear ratio of the transmission.

Figure 2:
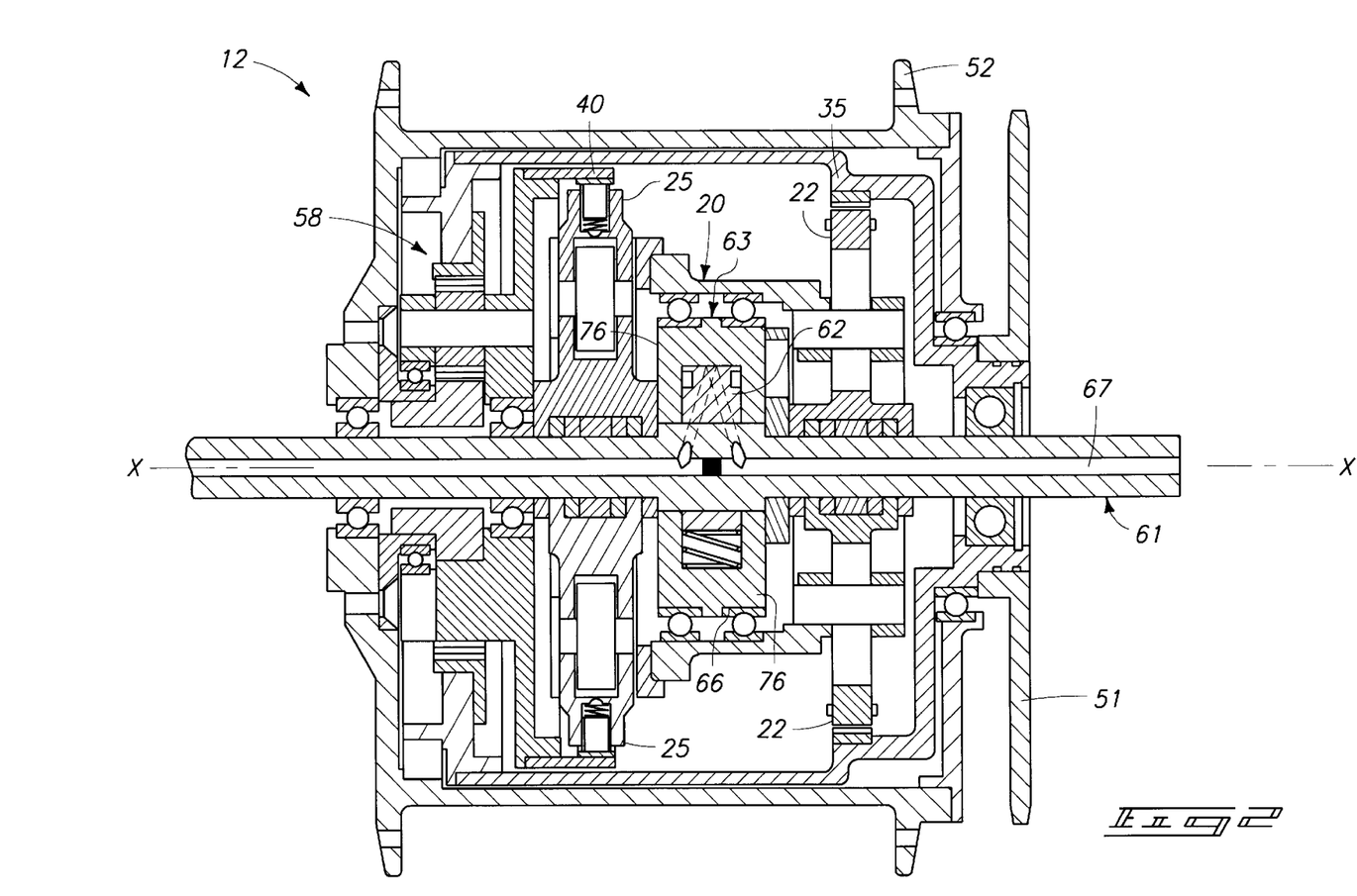
FIG. 2 is a cross-sectional view of the central axle and eccentric assembly shown in FIG. 1 provided within a continuously variable transmission.

Referring to FIG. 2, the eccentric assembly 63 shown in FIG. 1 is provided within an embodiment of a continuously variable transmission 12. Continuously variable transmission 12 illustrated in FIG. 2 is exemplary only and the shift mechanism 60 of the present invention is utilized with other transmission configurations in accordance with other embodiments of the invention.

As shown, eccentric mount 76 comprising eccentric members 64, 65 defines a cylindrical outer surface 66. Outer surface 66 is formed about the eccentric axis E—E (axis E—E is coaxial with central axis X—X in FIG. 2). An orbiter 20 is rotatably mounted and supported by the cylindrical outer surface 66. Orbiter 20 is configured for rotational movement about the variable eccentric axis E—E. Accordingly, the axis of rotation of orbiter 20 (i.e., axis E—E) is radially adjustable with respect to central axis X—X. Adjustment of the axis of rotation of orbiter 20 adjusts the gear ratio of the transmission 12 as described in detail hereafter.

The illustrated continuously variable transmission 12 generally comprises a plurality of input and output vanes 22, 25. Orbiter 20 is configured to operably couple input and output vanes 22, 25. Input and output vanes 22, 25 are configured for engagement with rotatable input and output ratchets 35, 40. The transmission 12 additionally includes coaxial first and second rotatable members in the form of a drive sprocket 51 and a driven wheel hub 52. They are arranged on the transmission 12 for independent rotation about central axis X—X thereof.

Drive sprocket 51 operates as an input drive element which is chain driven in one embodiment. Drive sprocket 51 is operably coupled to input ratchet 35 to impart sequential driving engagement between a drive ring of the input ratchet and the outer ends of the sequentially operating input vanes 22.

One embodiment of driven wheel hub 52 comprises a bicycle wheel hub. It is operably coupled to output ratchet 40 for rotation about the central axis X—X in response to sequential driving engagement between the outer ends of the output vanes 25 and a driven ring of the output ratchet 40.

The input vanes are rotatably supported about the central axis X—X at their respective inner ends for variable rotation about the central axis in relation to one another. The input vanes 22 are pivotally and slidably coupled to the orbiter 20 at their respective intermediate sections. Rotatable input ratchet 35 is concentric with the central axis X—X and includes a directionally toothed driving ring circumferentially surrounding the input vanes 22. The outer ends of the respective input vanes 22 each have a yieldable tooth selectively engaging the driving ring of input ratchet 35.

The respective output vanes 25 each also have an inner end, an outer end, and an intermediate section. They are rotatably supported about the central axis X—X at their respective inner ends for variable rotation about the central axis in relation to one another. The output vanes 25 are pivotally and slidably coupled to the orbiter 20 at their respective intermediate sections.

Rotatable output ratchet 40 is concentric with the central axis X—X and includes a directionally toothed driven ring circumferentially surrounding the output vanes 25. The toothed rings 36 and 37 of the respective input and output ratchets 35 and 40 have oppositely facing circular patterns of internal teeth formed thereon.

The outer ends of the respective output vanes 25 each have a yieldable tooth selectively engaging the teeth about the driven ring 37. The teeth on the respective output vanes 25 face oppositely to the teeth on the input vanes 22.

In the illustrated embodiment, a planetary gear assembly generally represented by the numeral 58 is provided to mechanically couple output ratchet 40 with output driven wheel hub 52. Planetary gear assembly 58 provides multiplier gearing at the output of the transmission 12. Such output multiplier gearing is omitted in other embodiments of the invention. In addition, other gearing configurations are utilized in accordance with other embodiments of the invention.

Referring to FIG. 3, the shift mechanism 60 is described below. The shift mechanism 60 is shown in a first orientation or position wherein the eccentric axis E—E is coaxial with central axis X—X. Eccentric assembly 63 and master cylinder 70 of shift mechanism 60 are shown mounted upon central axle 61 and about central axis X—X.

The disclosed embodiment of the invention provides a hydraulic shift mechanism for implementing desired gear ratio adjustment. The described hydraulic shift mechanism 60 comprises master cylinder 70 and a slave cylinder 80. Master cylinder 70 is mounted upon central axle 61. Support member 62 and eccentric mount 76 of eccentric assembly 63 form slave cylinder 80 in accordance with a first embodiment of the invention. In alternative embodiments of the invention described below, the slave cylinder is provided in a discrete configuration.

Master cylinder 70 is spaced from eccentric assembly 63 in the depicted embodiment. Master cylinder 70 comprises a cylindrical outer casing 71 and a piston 72 provided therein. An actuator 73 is operably connected to master cylinder 70 to provide operator control thereof. In one embodiment of the invention, actuator 73 comprises a cable shifter operably mounted to the handlebars of a bicycle. Other actuator assemblies are possible in accordance with other embodiments of the present invention.

Eccentric mount 76 and support member 62 form slave cylinder 80. The eccentric mount 76, functioning as a slave cylinder casing in the presently described embodiment, is provided in the first position in FIG. 3. Support member 62 operates as a piston within the slave cylinder casing comprising eccentric mount 76. Casing or eccentric mount 76 is configured for movement relative to piston or support member 62.

An internal biasing spring 85 is attached to support member 62 and an internal surface of lower eccentric member 65 in this embodiment of the invention. Biasing spring 85 is configured to apply a biasing force against eccentric member 65 of eccentric mount 76. The biasing force urges the eccentric mount 76 toward the first position shown in FIG. 3. In particular, the biasing force coaxially aligns the eccentric axis E—E of eccentric mount 76 with the central axis X—X defined by central axle 61. In such a coaxial alignment configuration, the transmission is locked up and the gear ratio is approximately 1 to 1.

Still referring to FIG. 3, actuator 73 is operable to move piston 72 within master cylinder casing 71 responsive to operator control. Cylinder casing 71 and piston 72 define an internal chamber 74 within master cylinder 70. Chamber 74 is configured to receive a fluid which preferably comprises an incompressible liquid such as a suitable hydraulic oil. Responsive to operator control via actuator 73, master piston 72 moves inward (to the right as shown in FIG. 3) thereby applying pressure to the fluid present within chamber 74.

Chamber 74 of master cylinder 70 is in fluid communication with eccentric assembly 63 in the first embodiment. In particular, central axle 61 contains an internal conduit 67 which preferably extends the entire length thereof. A stop 68 may be provided within conduit 67 adjacent support member 62 as shown in FIG. 3. Stop 68 provides two portions within internal conduit 67.

An opening 75 within the casing 71 of master cylinder 70 provides fluid communication from chamber 74 to the exterior portion of central axle 61. Central axle 61 contains a mating opening 69 aligned with opening 75. Openings 69, 75 provide fluid communication between chamber 74 and internal conduit 67.

Responsive to actuation via actuator 73, piston 72 moves to the right, thereby applying pressure to fluid within chamber 74 of master cylinder assembly 70. The applied pressure circulates fluid from chamber 74 into conduit 67 via openings 69, 75.

Internal conduit 67 is in fluid communication with eccentric assembly 63 and slave cylinder 80 defined thereby in accordance with the first embodiment of the present invention. More specifically, support member 62 of eccentric assembly 61 includes at least one internal opening 81 in communication with conduit 67. In the illustrated embodiment, a second internal opening 82 is also in fluid communication with conduit 67 as shown in FIG. 3. Internal openings 81, 82 provide fluid communication of slave cylinder 80 with respective portions of internal conduit 67. Internal conduit 67 is accessible at either end of central axle 61 facilitating bleeding of the hydraulic shift mechanism 60.

Openings 81, 82 provide fluid communication from respective portions of internal conduit 67 to a boss 83 formed on support member 62. The application of fluid from chamber 74 of master cylinder assembly 70 into conduit 67 forces fluid within conduit 67 and first opening 81 to boss 83. The fluid exits opening 81 and exerts a force against an internal wall 84 of eccentric assembly 63.

Referring to FIG. 3A, the application of fluid under pressure against internal wall 84 of upper eccentric member 64 is sufficient to overcome the bias of internal spring 85. Subsequently, eccentric mount 76 moves in an upward direction to the extreme second position shown in FIG. 3A. Upward movement of eccentric mount 76 with respect to support member 62 and central axle 61 forms a chamber 86 within slave cylinder 80. Fluid passes from conduit 67 through opening 81 into chamber 86 to hold eccentric mount 76 in the illustrated second position for desired period of time. The internal biasing spring 85 is fully compressed while eccentric mount 76 is in the second position.

While eccentric mount 76 is provided in the second position, eccentric axis E—E is spaced from central axis X—X as shown. Eccentric axis E—E is parallel with central axis X—X. The position of eccentric mount 76 in FIG. 3A provides a gear ratio of 1 to 2.6 within the continuously variable transmission 12 illustrated in FIG. 2. The dimensions of the components of slave cylinder 80 may be varied to provide other desired gear ratios.

Once the operator of the vehicle decides to shift down, the piston 72 of master cylinder assembly 70 moves to the left responsive to operator input via actuator 73. Subsequently, pressure is removed from the fluid present within chamber 74, openings 69, 75, 81, conduit 67, and internal chamber 86 of slave cylinder 80. With the aid of biasing spring 85, eccentric assembly 63 returns to the position shown in FIG. 3. In other embodiments, a biasing spring 85 is not utilized and the pedaling of the bicycle is sufficient to return eccentric mount 76 to the original position shown in FIG. 3.

Referring now to FIG. 4 and FIG. 4A, the position of eccentric mount 76 of eccentric assembly 63 with respect to central axle 61 and central axis X—X is further described. The orientation of eccentric mount 76 about support member 62 as shown in FIG. 4 provides a 1 to 1 gear ratio wherein the transmission 61 is locked up. The fluid has been removed from chamber 86 within slave cylinder 80, and boss 83 is flush with internal wall 84 of upper eccentric member 64. Further, biasing spring 85 is fully extended in the position shown in FIG. 4 urging eccentric mount 76 downward.

Hydraulic fluid under pressure from master cylinder 70 as described above fills chamber 86 of slave cylinder 80 providing eccentric mount 76 in its furthest eccentric position with respect to support member 62 as shown in FIG. 4A. Biasing spring 85 is fully compressed in the illustrated second position and the eccentric axis E—E is spaced from central axis X—X.

Referring to FIG. 5 and FIG. 5A, an alternative embodiment of the shift mechanism is shown. Like numerals in FIG. 5 and FIG. 5A represent like components with respect to the previously described embodiments of the invention with variations therein indicated by the suffix "a".

Similar to the operation of the above described embodiment of the invention, the shift mechanism 60a illustrated in FIG. 5 and FIG. 5A provides variable eccentricity of eccentric axis E—E relative to central axis X—X to vary the gear ratios provided by the transmission. The illustrated shift mechanism 60a is mounted upon on a bracket or frame of a bicycle. The shift mechanism 60a is arranged about a central axle 61a which comprises a bicycle crank axle in the depicted embodiment. Shift mechanism 60a can also be configured for use with other vehicles.

The depicted second embodiment of the shift mechanism 60a includes an eccentric assembly 63a. Eccentric assembly 63a comprises a support member 62a and an eccentric mount 76a. Support member 62a is a portion of the frame of the bicycle housing the crank axle in the illustrated embodiment. The frame or support member 62a is defines a chamber 95 configured to receive eccentric mount 76a. Eccentric mount 76a defines a cylindrical inner surface 96. An orbiter 20a is provided within eccentric mount 76a in the shift mechanism 60a shown in FIG. 5 and FIG. 5A. Bearings 77 are typically provided intermediate orbiter 20a and eccentric mount 76a. Orbiter 20a defines a central aperture 91 provided about and configured to receive central axle 61a. One embodiment of orbiter 20a is coupled with input and output vanes 22, 25 of continuously variable transmission 12 as described above and in detail in the '702 patent incorporated by reference above. Orbiter 20a is configured for rotation about central axis 61a.

Eccentric mount 76a and the orbiter 20a therein define the eccentric axis E—E (shown in FIG. 5A). Eccentric mount 76a and orbiter 20a are slidably movable within the chamber 95 of support member 62a between a first position shown in FIG. 5 and a second position shown in FIG. 5A.

Support member 62a provides a slave cylinder 80a in the illustrated embodiment of the invention. Slave cylinder 80a is in fluid communication with a master cylinder (not shown in FIGS. 5, 5A) via a connection 92. Slave cylinder 80a comprises a piston 93 and casing 94. Slave cylinder 80a is shown internally formed within support member 62a in the depicted embodiment. Slave cylinder 80a may be externally mounted of support member 62a in other embodiments.

Responsive to control from a user via actuator 73, pressure is applied to fluid (e.g., hydraulic oil) within connection 92 by a master cylinder. The application of pressure to the internal oil acts upon piston 93. Piston 93 moves toward eccentric mount 76a responsive to the pressure applied to the fluid within connection 92 and casing 94. More specifically, piston 93 moves eccentric mount 76 from the first (original) position shown in FIG. 5 to the second (eccentric) position shown in FIG. 5A. Hydraulic fluid fills chamber 86a of slave cylinder 80a and maintains eccentric mount 76a in the second position.

Eccentric axis E—E is coaxial with central axis X—X in the first position shown in FIG. 5. In such a position, the continuously variable transmission 12 is locked up and provides a gear ratio of 1 to 1. Referring to FIG. 5A, eccentric mount 76a and orbiter 20a therein are shown in the second position. Eccentric axis E—E is spaced from central axis X—X in FIG. 5A providing a higher gear ratio.

In the depicted embodiment of shift mechanism 60a, a biasing spring 85a is provided within chamber 95 and intermediate eccentric mount 76a and an internal wall of support member 62a. Biasing spring 85a urges eccentric mount 76a to the first position shown in FIG. 5 following removal of pressure by piston 93 against eccentric mount 76.

Hydraulic forces created by slave cylinder 80a are sufficient to overcome the biasing force of spring 85a when provision of eccentric mount 76a in the second position within support member 62a (shown in FIG. 5A) is desired. Biasing spring 85a is omitted in other embodiments of the present invention inasmuch as peddling of the user is typically sufficient to return eccentric mount 76a to the first position shown in FIG. 5.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A transmission shift mechanism comprising:
   a central axle defining a central axis;
   a master cylinder configured to increase the pressure of a liquid; and
   an eccentric assembly comprising a support member provided about the central axle and an eccentric mount coupled with the support member, the eccentric mount defining an eccentric axis and being in fluid communication with the master cylinder and configured to move between first and second radial positions relative to the central axle to provide radial adjustment of the eccentric axis relative to the central axis.

2. The shift mechanism according to claim 1 further comprising a slave cylinder formed within the support member and configured to selectively adjust the position of the eccentric mount.

3. The shift mechanism according to claim 1 wherein the eccentric assembly forms a slave cylinder.

4. The shift mechanism according to claim 3 wherein the support member and eccentric mount respectively comprise a piston and a casing of the slave cylinder.

5. The shift mechanism according to claim 1 wherein the eccentric axis is parallel to the central axis.

6. The shift mechanism according to claim 1 wherein the eccentric mount is slidably coupled with the support member.

7. The shift mechanism according to claim 1 wherein the support member is fixed relative to the central axle.

8. The shift mechanism according to claim 1 wherein the central axle provides fluid communication of the master cylinder and the eccentric assembly.

9. The shift mechanism according to claim 1 further comprising an orbiter rotatably supported by the eccentric mount.

10. In a transmission comprising first and second rotatable members individually configured for rotation about a central axis defined by a central axle; an orbiter coupled with the first and second rotatable members and configured for rotation about an eccentric axis, and a shift mechanism configured to adjust the position of the eccentric axis relative to the central axis, the shift mechanism comprises:
    a master cylinder configured to adjust the pressure of a fluid;
    a support member provided about the central axle; and
    an eccentric mount defining the eccentric axis and configured to rotatably support the orbiter, the eccentric mount being in fluid communication with the master cylinder and movable between first and second radial positions relative to the central axle responsive to the pressure of the fluid.

11. The shift mechanism according to claim 10 wherein the eccentric mount is slidably mounted to the support member.

12. The shift mechanism according to claim 10 wherein the support member and the eccentric mount form a slave cylinder.

13. The shift mechanism according to claim 10 wherein the eccentric mount is provided within the support member.

14. The shift mechanism according to claim 10 wherein the eccentric mount is sealed about the support member.

15. The shift mechanism according to claim 10 wherein the fluid is incompressible.

16. The shift mechanism according to claim 10 further comprising an actuator operable to control the master cylinder and the pressure of the fluid.

17. The shift mechanism according to claim 10 wherein the support member is fixed relative to the central axle.

18. A method of controlling a transmission, comprising:

providing a support member about a central axle which defines a central axis;

providing an eccentric mount defining an eccentric axis;

supplying a fluid to a piston operably coupled with the eccentric mount;

adjusting the pressure of the fluid; and adjusting a radial position of the eccentric mount relative to the central axle to adjust the eccentricity of the eccentric axis with respect to the central axis responsive to the adjusting of the pressure of the fluid.

19. The method according to claim 18 further comprising forming a slave cylinder with the eccentric mount and the support member.

20. The method according to claim 19 wherein the supplying fills a chamber within the slave cylinder with the fluid.

21. The method according to claim 18 further comprising sealing the eccentric mount about the support member.

22. The method according to claim 18 wherein the adjusting the radial position of the eccentric mount comprises sliding the eccentric mount relative to the central axle.

23. The method according to claim 18 further comprising selectively providing the eccentric axis and central axis in a coaxial orientation.

24. The method according to claim 18 wherein the adjusting the radial position of the eccentric mount adjusts the gear ratio of the transmission.

25. The method according to claim 18 further comprising providing a master cylinder for the adjusting the pressure of the fluid.

26. The method according to claim 18 wherein the supplying comprises supplying the fluid to the eccentric mount through the central axle.

* * * * *

UNITED STATES PATENT AND TRADEMARK OFFICE
CERTIFICATE OF CORRECTION

PATENT NO : 6055878
DATED : May 2, 2000
INVENTOR(S) : Ned D. Mills et al.

It is certified that error appears in the above-identified patent and that said Letters Patent are hereby corrected as shown below:

Col. 6, line 67

"is" should be deleted.

Signed and Sealed this

Twenty-fourth Day of April, 2001

Attest:

NICHOLAS P. GODICI

Attesting Officer

Acting Director of the United States Patent and Trademark Office